(12) United States Patent
Chudy et al.

(10) Patent No.: US 7,052,022 B2
(45) Date of Patent: May 30, 2006

(54) CHUCK FOR PNEUMATIC HAMMER

(75) Inventors: Frederick C. Chudy, Greenfield, WI (US); Raymond E. Kinsley, Racine, WI (US)

(73) Assignee: Snap-on Incorporated, Kenosha, WI (US)

( * ) Notice: Subject to any disclaimer, the term of this patent is extended or adjusted under 35 U.S.C. 154(b) by 53 days.

(21) Appl. No.: 10/436,550

(22) Filed: May 13, 2003

(65) Prior Publication Data

US 2004/0227307 A1 Nov. 18, 2004

(51) Int. Cl.
*B23B 31/06* (2006.01)

(52) U.S. Cl. .................... 279/143; 279/19.3; 279/19.6; 279/75; 403/322.2

(58) Field of Classification Search .................... 279/7, 279/8, 19, 19.3, 19.4, 19.5, 19.6, 74, 75, 279/143, 145; 173/93, 109; 403/322.2
See application file for complete search history.

(56) References Cited

U.S. PATENT DOCUMENTS

| | | | | |
|---|---|---|---|---|
| 3,251,605 A * | 5/1966 | Ondeck | ........................ | 279/82 |
| 4,107,949 A | 8/1978 | Wanner et al. | ................. | 64/9 A |
| 4,174,113 A | 11/1979 | Eckman | ..................... | 279/19.4 |
| 4,184,692 A * | 1/1980 | Benson et al. | ................. | 279/75 |
| 4,188,041 A | 2/1980 | Soderberg | .................... | 279/75 |
| 4,273,344 A | 6/1981 | Benson et al. | ................. | 279/75 |
| 4,378,053 A * | 3/1983 | Simpson | ....................... | 173/13 |
| 4,749,316 A * | 6/1988 | Hendricks | ............... | 408/239 R |
| 4,900,202 A | 2/1990 | Wienhold | .................... | 408/240 |
| 5,062,749 A * | 11/1991 | Sheets | ........................ | 279/75 |
| 5,464,229 A * | 11/1995 | Salpaka | ....................... | 279/30 |
| 5,496,139 A | 3/1996 | Ghode et al. | ............... | 409/182 |
| 5,806,859 A * | 9/1998 | Saccomanno, III | ......... | 279/143 |
| 5,957,634 A * | 9/1999 | Carpinetti | .................... | 408/226 |
| 5,971,403 A | 10/1999 | Yanhagi et al. | ............. | 279/19.3 |
| 5,988,957 A | 11/1999 | Wheeler | ................. | 408/239 R |
| 6,047,779 A * | 4/2000 | Wallace | ....................... | 173/93.5 |
| 6,241,026 B1 | 6/2001 | Wache et al. | ............... | 173/132 |
| 6,270,085 B1 | 8/2001 | Chen et al. | .................... | 279/22 |
| 6,325,393 B1 | 12/2001 | Chen et al. | .................... | 279/22 |
| 6,516,903 B1 * | 2/2003 | Rogers | ........................ | 175/300 |
| D472,782 S | 4/2003 | Pusateri et al. | ................. | D8/68 |
| 2001/0043841 A1 | 11/2001 | Wienhold | .................... | 408/240 |
| 2003/0178794 A1 | 9/2003 | Chen et al. | .................... | 279/22 |

OTHER PUBLICATIONS

Snap-on Catalog 600, copyright 2001 front page, Inside front page and p. 253.

* cited by examiner

*Primary Examiner*—Boyer D. Ashley
*Assistant Examiner*—Michael W. Talbot
(74) *Attorney, Agent, or Firm*—Barnes & Thornburg LLP

(57) ABSTRACT

A chuck for a pneumatic hammer including an insert and a pin engaged with the insert and one or more other components of the chuck, such as, for example, the nosepiece. The pin is configured to prevent or otherwise limit rotation of the insert relative to the one or more components of the chuck.

15 Claims, 2 Drawing Sheets

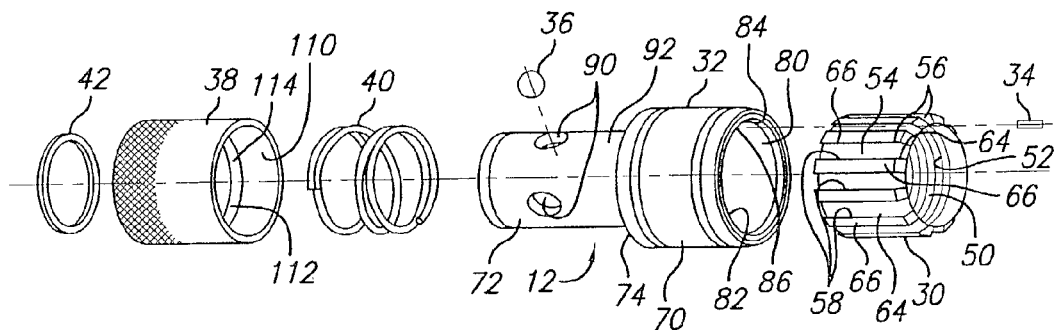
FIG. 2
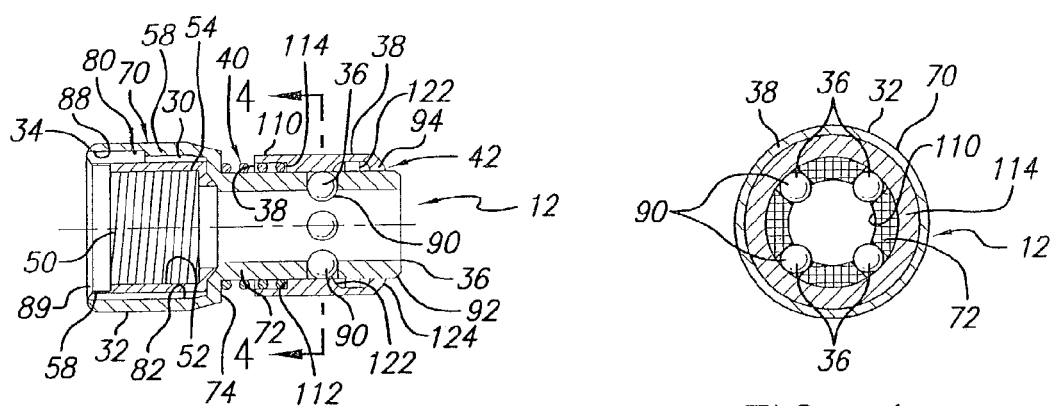
FIG. 3
FIG. 4
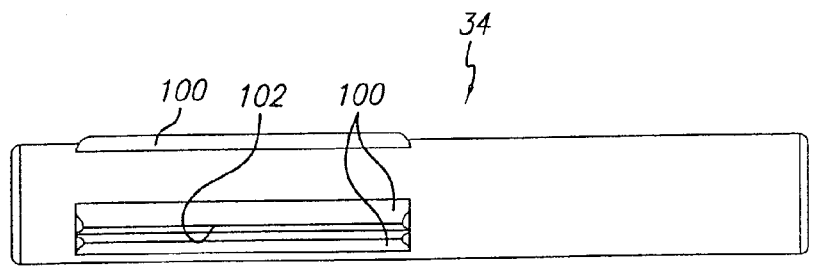
FIG. 5

CHUCK FOR PNEUMATIC HAMMER

BACKGROUND AND SUMMARY

The present disclosure relates to a chuck for a pneumatic hammer.

Pneumatic hammers typically use a chuck for retaining and readily changing hammer bits. The chuck often includes a nosepiece engaged with the barrel of the pneumatic hammer and a polymer insert received by the nosepiece. The insert is threaded onto the barrel of the pneumatic hammer. If the adhesive bond is broken, however, removal of the retaining chuck from the barrel is difficult.

The present disclosure relates to a chuck for a pneumatic hammer. The chuck includes an insert and a pin engaged with the insert and one or more other components of the chuck, such as, for example, the nosepiece. The pin is configured to prevent or otherwise limit rotation of the insert relative to the one or more components of the chuck.

Additional features will become apparent to those skilled in the art upon consideration of the following detailed description of drawings exemplifying the best mode as presently perceived.

BRIEF DESCRIPTION OF THE DRAWINGS

The detailed description particularly refers to the accompanying figures in which:

FIG. 2 is an exploded perspective view of the chuck of FIG. 1;

FIG. 3 is a cross section of the chuck of FIG. 1 taken along its longitudinal axis;

FIG. 4 is a cross section taken along the lines 4—4 of FIG. 3; and

FIG. 5 is a plan view of the pin of the chuck of FIG. 1.

DETAILED DESCRIPTION OF THE ILLUSTRATED EMBODIMENT

Figure 1:
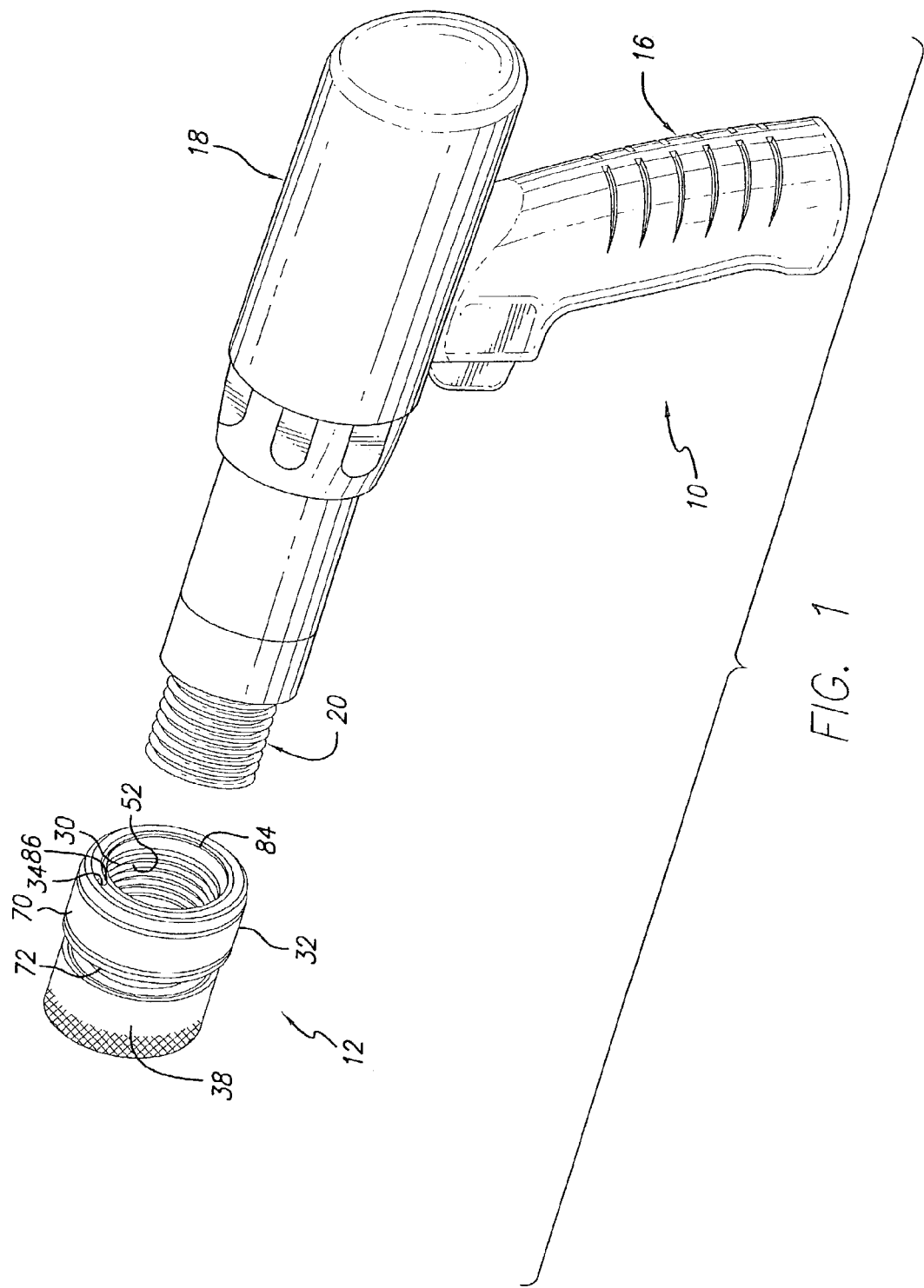
FIG. 1 is an exploded perspective view of a pneumatic hammer and a chuck configured to be secured to the barrel of the pneumatic hammer.

While the present disclosure may be susceptible to embodiment in different forms, there is shown in the drawings, and herein will be described in detail, embodiments with the understanding that the present description is to be considered an exemplification of the principles of the disclosure and is not intended to limit the disclosure to the details of construction and the arrangements of components set forth in the following description or illustrated in the drawings.

FIGS. 1–5 together illustrate a pneumatic hammer 10 and a chuck 12 in accordance with an embodiment of the present disclosure for engaging a hammer bit or other pneumatic hammer accessory. The pneumatic hammer 10 may have any suitable configuration. The illustrated pneumatic hammer 10, for example, includes a handle 16, a body 18, and a threaded barrel 20.

The chuck 12 in accordance with the illustrated embodiment includes an insert 30; a retaining nosepiece 32 that receives the insert; a pin 34 engaging the insert and the retaining nosepiece to prevent or otherwise limit rotation of the insert relative to the nosepiece; four bearings 36; a retaining sleeve 38; a spring 40; and a retaining ring 42. The chuck 12 is threadedly engaged with the threaded barrel 20 of the pneumatic hammer 10 as hereinafter described. The chuck 12 may have any other suitable construction and may include more or less components in accordance with other embodiments. Similarly, the means for preventing or otherwise limiting rotation of the insert 30 relative to the nosepiece 32 may have any other suitable construction and may include more or less components in accordance with other embodiments The illustrated insert 30 has a hollow generally cylindrical configuration. The insert 30 includes a threaded inner wall 50 defining a channel 52 configured to threadingly engage the barrel 20 of the pneumatic hammer 10, and an outer wall 54 that includes a plurality of ridges 56 defining a plurality of grooves 58 extending substantially along the length of the retainer 30. Each of the grooves 58 is configured to receive the pin 34. The groove 58 that receives the pin 34 may depend on the positioning of the insert 30 relative to the nosepiece 32.

Each of the ridges 56 has a generally square or rectangular cross section, substantially along its length, and includes a pair of upstanding walls 64 and a top surface 66 interconnecting the upstanding walls. Each of the grooves 58 has a U-shaped cross section extending substantially along the length of the retainer 30. The ridges 56 and grooves 58 may have any other suitable configuration in accordance with other embodiments.

The insert 30 may be constructed of any suitable material, such as, for example, any suitable polymer or other flexible material. It may, for example, be constructed of: Dow-Pellethane 2103-80AE, Thermoplastic Polyurethane Elastomer, Durometer 80±5 Shore "A". The insert 30 may have any other suitable configuration in accordance with other embodiments.

The illustrated retaining nosepiece 32 includes a receiving portion 70 for receiving the insert 30 and the barrel 20 of the pneumatic hammer 10 and a nosepiece sleeve 72 that form a spring contact wall 74 for abuttingly engaging one end of the spring 40. The receiving portion 70 includes an inner wall 80 defining a channel 82 for snugly receiving the insert 30. The receiving portion 70 includes a front face that may be in the form of an inwardly-extending annular lip 84 that defines a hole 86 for receiving the pin 34. Additionally, the inner wall 80 of the receiving portion 70 defines an elongated slot 88 for receiving the pin 34. The slot 88 has a semi-circular cross section so that the pin 34 protrudes into one of the grooves 58 of the insert 30.

The nosepiece sleeve 72 defines four bearing holes 90 for receivingly engaging the bearings 36. The outer diameter of the receiving portion 70 is greater than the outer diameter of the nosepiece sleeve 72. The receiving portion 70 is configured to snugly receive the insert 30, and the nosepiece sleeve 72 is configured to receive the hammer bit or other pneumatic hammer accessory. Thus, the inner diameter of the receiving portion 70 also is greater than the inner diameter of the nosepiece sleeve 72. The outer wall 92 of the nosepiece sleeve 72 adjacent the distal end of the sleeve defines an annular slot 94 for receiving the retaining ring 42. The spring 40 is disposed about the nosepiece sleeve 72. The nosepiece 32 may have any other suitable configuration in accordance with other embodiments.

The illustrated pin 34 is elongated and includes three pairs of elongated protuberances 100 circumferentially spaced about the pin for gripping the insert 30. Each protuberance 100 has a generally triangular cross section and is located immediately adjacent its respective other elongated protuberance to define a groove 102 having a triangular cross section. The illustrated pin 34 is a commercially available groove pin. The pin 34 may have any other suitable configuration, may have protuberances of any other suitable configuration, or may be free of protuberances in accordance with other embodiments. The ends of the elongated protuberances 100 and the ends of the pin 34 are chamfered.

The pin 34 is received within the hole 86 and slot 88 of the receiving portion 70 of the retaining nosepiece 32 and within one of the grooves 58 of the insert 30 to prevent or otherwise limit rotation of the insert relative to the nosepiece. The ridges 56 of the insert 30 provide generally uniform spacing of the insert relative to the inner wall 80 of the receiving portion 70 of the nosepiece 32. The protuberances 100 may provide additional ability to grip the insert 30 to limit rotation of the insert relative to the nosepiece 32. Inclusion of three pairs of protuberances 100 enables the pin 34 to engage the insert 30 at alternate positions, depending upon the positioning of the pin.

The illustrated retaining sleeve 38 is generally cylindrical and defines a channel 110 for receiving the nosepiece sleeve 72 and the spring 40. The retaining sleeve 38 includes an annular boss 114 for applying pressure to the bearings 36 to facilitate engagement of the hammer bit or other pneumatic hammer accessory and the chuck 12. The annular boss 114 forms on one side an inner spring contact wall 112 for abuttingly engaging the other end of the spring 40, and another wall 122. The retaining sleeve 38 also includes a retaining ring contact wall 124 for engaging the retaining ring 42. The retaining sleeve 38 is disposed about the nosepiece sleeve 72 and the spring 40 so that the nosepiece sleeve extends through the channel 110, with the spring 40 disposed about the nosepiece sleeve 72 and extending from the inner spring contact wall 112 of the retaining sleeve 38 to the spring contact wall 74 of the nosepiece 32. The retaining ring 42 maintains the retaining sleeve 38 disposed about the nosepiece sleeve 72. The retaining sleeve 38 may have any other suitable configuration in accordance with other embodiments.

The illustrated retaining sleeve 38 is slidable relative to the nosepiece 32 between a locked position to engage the hammer bit or other accessory and a release position to release the accessory, and is biased by the spring 40 towards the locked position. In the locked position, the annular boss 114 of the retaining sleeve 38 exerts pressure on the bearings 36 in a direction toward the accessory which in turn enables the bearings to engage the accessory. The retaining sleeve 38 can be moved toward the release position by pulling the retaining sleeve toward the receiving portion 70 of the nosepiece 32, which causes the retaining sleeve to slide relative to the nosepiece 32. As this occurs, the pressure applied on the bearings 36 by the annular boss 114 is reduced, causing the bearings to release the accessory by moving in a direction away therefrom, and thus permitting the disengagement manually or otherwise of the accessory from the chuck 12.

The nosepiece 32, the retaining sleeve 38, the spring 42 and the retaining ring 42 accordingly provide an example of means for releasably engaging the pneumatic hammer and the accessory. Each of these components, however, may have any other suitable construction to cause such releaseable engagement. Additionally, the means for releasably engaging may have any other suitable configuration and construction in accordance with other embodiments. The means for releasably engaging may, for example, have a construction known in the art.

The present disclosure also may include a method for preventing or otherwise limiting the rotation of the insert 30 relative to the nosepiece 32. The method may, for example, include inserting the insert 30 into the channel 82 defined by the nosepiece 32, and inserting the pin 34 into the hole 86 defined by the nosepiece and one of the plurality of grooves 58 defined by the insert. The method may also include any of the other disclosure provided herein.

While a preferred embodiment of the disclosure is shown and described, it is envisioned that those skilled in the art may devise various modifications and equivalents without departing from the spirit and scope of the disclosure as recited in the following claims.

What is claimed is:

1. A chuck for engaging a pneumatic hammer and a pneumatic hammer accessory comprising:
    a nosepiece having a front face defining a hole and an inner wall defining a channel for receiving a pneumatic hammer accessory;
    an insert received by the channel and configured to engage the pneumatic hammer, the insert having an outer insert wall defining at least one groove;
    a pin received by the hole of the nosepiece and the groove of the insert to limit rotation of the insert relative to the nosepiece; and
    a retaining sleeve and wherein the nosepiece includes a nosepiece sleeve, the retaining sleeve disposed about the nosepiece sleeve.

2. The chuck of claim 1 wherein the pin is a grooved pin.

3. The chuck of claim 1 wherein the pin comprises at least one protuberance configured to engage the insert.

4. The chuck of claim 3 wherein the protuberance is elongated and extends along a portion of the length of the pin.

5. The chuck of claim 1 wherein the pin comprises a plurality of circumferentially-spaced pairs of protuberances configured to engage the insert.

6. The chuck of claim 5 wherein each protuberance is elongated and extends along a portion of the length of the pin.

7. The chuck of claim 1 wherein the inner wall of the nosepiece defines a slot adjacent the groove receiving the pin.

8. The chuck of claim 7 wherein a portion of the inner wall defining the slot is arcuate.

9. The chuck of claim 1 wherein the retaining sleeve is movable between a first position and a second position, the retaining sleeve configured to cause the nosepiece to engage the accessory received by the channel of the nosepiece when the retaining sleeve is in the first position and to release the accessory when the retaining sleeve is in the second position.

10. The chuck of claim 9 wherein the retaining sleeve is biased toward the first position.

11. The chuck of claim 9 further comprising a spring coupled to the nosepiece and the retaining sleeve, the retaining sleeve disposed about the spring, and the spring biasing the retaining sleeve toward the first position.

12. The chuck of claim 1 further comprising a retaining ring coupling the retaining sleeve to the nosepiece sleeve.

13. The chuck of claim 1 wherein the outer insert wall of the insert includes a plurality of ridges engaging the inner wall of the nosepiece, the ridges defining a plurality of the grooves, each groove configured to receive the pin.

14. The chuck of claim 1 wherein the pin comprises a plurality of protuberances configured to engage the insert, each protuberance being elongated and extending along a portion of the length of the pin.

15. The chuck of claim 1 wherein the inner wall of the nosepiece defines a slot adjacent the groove receiving the pin.

* * * * *